United States Patent [19]

Takeda et al.

[11] Patent Number: 5,682,207
[45] Date of Patent: Oct. 28, 1997

[54] IMAGE DISPLAY APPARATUS FOR SIMULTANEOUS DISPLAY OF A PLURALITY OF IMAGES

[75] Inventors: Koji Takeda, Kanagawa; Makoto Hiyamizu, Tokyo, both of Japan

[73] Assignee: Sony Corporation, Tokyo, Japan

[21] Appl. No.: 671,093

[22] Filed: Jun. 28, 1996

Related U.S. Application Data

[63] Continuation of Ser. No. 200,784, Feb. 23, 1994, abandoned.

[30] Foreign Application Priority Data

| Feb. 26, 1993 | [JP] | Japan | 5-038896 |
| Feb. 26, 1993 | [JP] | Japan | 5-038901 |
| May 31, 1993 | [JP] | Japan | 5-129783 |

[51] Int. Cl.⁶ .......................... H04N 5/445; G09G 1/04
[52] U.S. Cl. .......................... 348/568; 348/567; 315/370
[58] Field of Search .......................... 315/370; 348/445, 348/556, 564, 565, 567, 568, 576, 584, 588, 596; H04N 5/445, 5/45, 5/46

[56] References Cited

U.S. PATENT DOCUMENTS

| 4,855,833 | 8/1989 | Kageyama et al. | 348/567 |
| 5,359,267 | 10/1994 | Wilber | 315/403 |

FOREIGN PATENT DOCUMENTS

| 0357813 | 3/1990 | European Pat. Off. | H04N 5/45 |
| 0376376 | 7/1990 | European Pat. Off. | H04N 5/45 |
| 0573280 | 12/1993 | European Pat. Off. | A04N 5/45 |
| 63-169184 | 7/1988 | Japan | H04N 5/45 |
| 350974 | 3/1991 | Japan | H04N 5/45 |
| 0352465 | 3/1991 | Japan | H04N 5/46 |
| 4117783 | 4/1992 | Japan | H04N 5/45 |
| 2262407 | 6/1993 | United Kingdom | H04N 7/01 |
| 9119384 | 12/1991 | WIPO | H04N 5/262 |

OTHER PUBLICATIONS

JAPIO Abstract Accession No. 02552284 and JP 63-169184, Jul. 13, 1988 (Katsuto).

Primary Examiner—John K. Peng
Assistant Examiner—John W. Miller
Attorney, Agent, or Firm—Jay H. Maioli

[57] ABSTRACT

An image display apparatus such as a television receiver has a frame memory for storing video signals. The image display apparatus displays a combination of main and auxiliary images on a display raster based on the video signals stored in the frame memory. Specifically, the image display apparatus displays a plurality of auxiliary images surrounded by respective frames, and responsive to a control signal from a remote control unit, for example, individually changes the manner in which the frames are displayed respectively around the auxiliary images. For example, the color of the frame displayed around one of the auxiliary images is changed when that one auxiliary image is selected.

7 Claims, 8 Drawing Sheets

IMAGE DISPLAY APPARATUS FOR SIMULTANEOUS DISPLAY OF A PLURALITY OF IMAGES

This is a continuation of application Ser. No. 08/200,784 filed Feb. 23, 1994 now abandoned.

BACKGROUND OF THE INVENTION

1. Field of the Invention

The present invention relates to an image display apparatus such as a television receiver, and more particularly to an image display apparatus for displaying smaller auxiliary images as inset images in a larger main image which is displayed.

2. Description of the Prior Art

It has heretofore been customary to display smaller auxiliary images as insets in a larger main image on a television receiver. For example, as shown in FIG. 1 of the accompanying drawings, three scaled-down auxiliary images $S_1$, $S_2$, $S_3$ may be displayed in a vertical array in a main image M that is displayed fully on a television display raster, or as shown in FIG. 2 of the accompanying drawings, only a matrix of scaled-down auxiliary images $S_{11} \sim S_{19}$ may be displayed on a television display raster. Such an auxiliary image display mode allows the user of the television receiver to confirm simultaneously the images that are being broadcast in a plurality of television channels.

If the user wishes to display one of the displayed auxiliary images as a new main image, the user operates a remote control unit or the like of the television receiver to control the television receiver to switch around the desired auxiliary image and the existing main image or to display only the desired auxiliary image as a new main image.

To permit the user to choose from the displayed auxiliary images, it is necessary to display some mark indicating which auxiliary image is to be selected. For example, as shown in FIG. 2, such a mark may comprise a pointer P displayed to point at any one of the displayed auxiliary images. Specifically, the user pushes an up/down key on the remote control unit to move the pointer P toward a desired auxiliary image. When the pointer P reaches the desired auxiliary image, the user pushes a confirmation key to indicate the selection of the desired auxiliary image to a control unit of the television receiver. In this manner, the user can select a desired one of the displayed auxiliary images. The displayed pointer P is, however, disadvantageous in that it prevents an underlying image area from being displayed.

When a plurality of scaled-down auxiliary images are simultaneously displayed on a television display raster, it has been the conventional practice to display them based on video signals of the same broadcasting system and at the same aspect ratio. Recent years have seen the coexistence of a plurality of broadcasting systems for transmitting image signals at different aspect ratios. Therefore, if only those auxiliary images which belong to one broadcasting system can be displayed on the television display raster, then the range of types of images that can be displayed as auxiliary images is limited, posing a limitation on the ability to select broadcasting channels using the displayed auxiliary images.

Another problem of the conventional auxiliary image display system is that the resolution of displayed scaled-down auxiliary images is lower than the resolution of images that are not scaled down. More specifically, if an image that is scaled down to a scale-down ratio of ½ for both vertical and horizontal dimensions is displayed, the number of scanning lines used to display the scaled-down image is ½ of the number of scanning lines used to display normal images that are not scaled down, with the result that the vertical resolution of the scaled-down image is ½ of the vertical resolution of the normal images. When the vertical resolution of a displayed image is lowered, the image cannot clearly be seen, and particularly characters superimposed over the image are not sufficiently distinguishable.

Furthermore, auxiliary images can only be displayed on a television display raster, and cannot be recorded by a video tape recorder (VTR), for example.

OBJECTS AND SUMMARY OF THE INVENTION

It is an object of the present invention to provide an image display apparatus which can display auxiliary images fully without image dropouts and is free of any limitations on the types of images that can be displayed as auxiliary images.

Another object of the present invention is to provide an image display apparatus which is capable of displaying scaled-down images without lowering the resolution thereof.

Still another object of the present invention is to provide an image display apparatus which can record auxiliary images easily on a VTR or the like.

According to the present invention, there is provided an image display apparatus comprising a memory for storing video signals, and control means for displaying a combination of main and auxiliary images on a display raster based on the video signals stored in the memory, the control means comprising means for displaying a plurality of auxiliary images surrounded by respective frames, and means responsive to a control signal for individually changing the manner in which the frames are displayed respectively around the auxiliary images.

According to the present invention, there is also provided an image display apparatus comprising a memory for storing video signals, and control means for displaying a combination of main and auxiliary images on a display raster based on the video signals stored in the memory, the control means comprising means for displaying a plurality of auxiliary images and means for displaying at least one of the auxiliary images as an image having an aspect ratio which is different from the aspect ratio of the main image or another auxiliary image.

The image display apparatus may further comprise a single tuner for successively cyclically receiving video signals transmitted in a plurality of channels as representing the respective auxiliary images.

The control means may further comprise means for displaying the main and auxiliary images without overlapping each other.

According to the present invention, there is further provided an image display apparatus comprising a memory for storing a video signal, and control means for displaying an image which is scaled down to 1/n (1<n) on a display raster on a cathode-ray tube based on the video signal stored in the memory, the control means comprising means for cropping data of each horizontal scanning line of the video signal to be stored in the memory to 1/n without cropping data of the video signal in a vertical direction, and means for reducing a vertical deflection angle to 1/n in the cathode-ray tube when the video signal read from the memory is supplied to the cathode-ray tube.

The image display apparatus may further comprise input means for storing a plurality of different video signals in the memory.

The image display apparatus may further comprise means for storing the video signal field by field into the memory.

According to the present invention, there is also provided an image display apparatus comprising means for generating a video signal to simultaneously display main and auxiliary images on a display raster, and means for outputting the video signal from a video signal output terminal.

With the above arrangement, since the manner in which the frames are displayed respectively around the auxiliary images can be changed individually, any selected one of the auxiliary images can well be indicated by the associated frame without any dropouts of displayed information which would otherwise result from use of a pointer displayed on a selected one of the auxiliary images.

At least one auxiliary image may be of an aspect ratio of a broadcasting system that is different from the broadcasting system of a main image or other auxiliary images, images having aspect ratios of different broadcasting systems can simultaneously be displayed in juxtaposed relation to each other.

The vertical deflection angle for a scaled-down image displayed on the cathode-ray tube is reduced in proportion to the scale-down ratio of the scaled-down image. Therefore, the number of horizontal scanning lines of the displayed scaled-down image remains unchanged, and the vertical resolution thereof is not lowered. A plurality of different input video signals may be stored in the frame memory and may simultaneously be displayed as scaled-down images, so that the scaled-down images can be displayed at a high resolution.

When a video signal is stored into the frame memory field by field, a scaled-down image can be displayed as a moving image similar to ordinary moving images that change on a real-time basis.

A video signal representing a combination of main and auxiliary images to be displayed can be outputted from the output terminal and recorded on a VTR or the like.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENT

Figure 3:
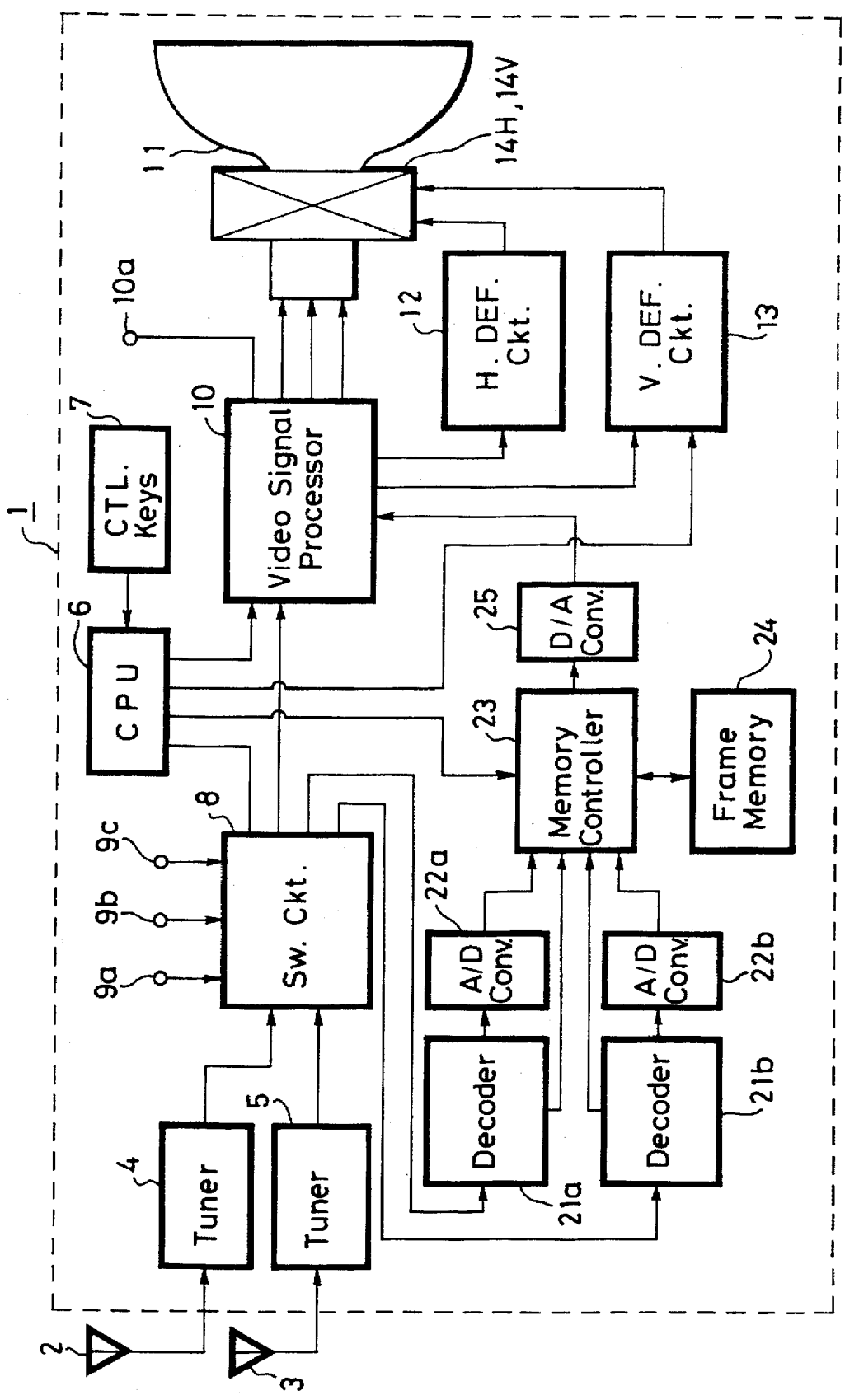
FIG. 3 is a block diagram of a television receiver as an image display apparatus according to the present invention.

An image display apparatus according to the present invention is particularly useful when embodied as a television receiver as shown in FIG. 3.

As shown in FIG. 3, the television receiver, generally designated by the reference numeral 1, has a pair of tuners 4, 5 connected to respective antennas 2, 3. Broadcast signals that are received by the antennas 2, 3 are supplied to the tuners 4, 5, which demodulate the broadcast signals in the frequency bands of certain broadcasting channels into video signals. The tuners 4, 5 are controlled to select received channels by a central processing unit (CPU) 6 which also controls various circuits of the television receiver 1. The central processing unit 6 comprises a microcomputer which controls the tuners 4, 5 and other circuits to select received channels and various operation modes of the television receiver 1 based on the operation of control keys 7 of the television receiver 1. The central processing unit 6 can also be operated by remote control signals transmitted from a remote control unit (not shown).

The video signals outputted by the tuners 4, 5 are supplied to a switch circuit 8. The television receiver 1 has a plurality of external video signal input terminals 9a, 9b, 9c for connection to various video signal sources including a VTR, a video disc player, etc. Video signals supplied from the video signal sources to the external video signal input terminals 9a, 9b, 9c are supplied to the switch circuit 8, which is controlled by the central processing unit 6 to select either one of the supplied video signals and supply the selected video signal to a video signal processor 10. The video signal processor 10 processes the supplied video signal under the control of the central processing unit 6 and supplies the processed video signal (RGB signal) to a cathode-ray tube 11 to display a corresponding image thereon.

The television receiver 1 also has an output terminal 10a for outputting a video signal which is essentially the same as the video signal that has been processed by the video signal processor 10 and supplied to the cathode-ray tube 11. Specifically, whereas the video signal supplied to the cathode-ray tube 11 is an RGB signal, the video signal outputted from the output terminal 10a is a composite video signal or luminance/chrominance-separated video signal. The video signal processor 10 thus has a processing circuit for generating a composite video signal or luminance/chrominance-separated video signal to be supplied to the output terminal 10a from an RGB signal.

The video signal processor 10 also extracts horizontal and vertical synchronizing signals from the video signal, and supplies the horizontal and vertical synchronizing signals to horizontal and vertical deflecting circuits 12, 13, respectively. The horizontal deflecting circuit 12 energizes a horizontal deflecting coil 14H mounted on the cathode-ray tube 11 based on the supplied horizontal synchronizing signal, and the vertical deflecting circuit 13 energizes a vertical deflecting coil 14V mounted on the cathode-ray tube 11 based on the supplied vertical synchronizing signal.

The television receiver 1 is arranged to display simultaneously a plurality of scaled-down images on the display raster of the cathode-ray tube 11. More specifically, the switch circuit 8 selects two of the video signals that are supplied from the tuners 4, 5 and the video signal input terminals 9a, 9b, 9c and supplies the selected two video signals to respective decoders 21a, 21b under the control of the central processing unit 6. The decoders 21a, 21b demodulate the supplied video signals into luminance and chrominance signals, and supply the luminance and chrominance signals to analog-to-digital (A/D) converters 22a, 22b. The A/D converters 22a, 22b convert the supplied luminance and chrominance signals into digital video signals, which are supplied to a memory controller 23. The decoders 21a, 21b supply synchronizing signals extracted from the video signals supplied thereto to the memory controller 23.

To the memory controller 23, there is connected a frame memory 24 which stores the two digital video signals supplied from the A/D converters 22a, 22b under the control of the memory controller 23 based on a command from the central processing unit 6. When the digital video signals are stored in the frame memory 24, the video data thereof are compressed or scaled down by being cropped or decimated according to the scale-down ratio of scaled-down images to be displayed. The digital video signals are stored in the frame memory 24 successively field by field.

According to the present invention, when the scaled-down video data of the digital video signals are stored in the frame memory 24 under the control of the memory controller 23, the memory controller 23 can simultaneously store, in the frame memory 24, data which represent a frame of a certain color that is added to each of the scaled-down images. Furthermore, the memory controller 23 can also store, in the frame memory 24, data which represent a background color that is applied to a background display area outside of main and auxiliary images which are displayed without overlapping each other, as described later on. These frame and background color data are generated by the memory controller 23 based on a command from the central processing unit 6.

The video data stored in the memory 24 are then read successively field by field into a digital-to-analog (D/A) converter 25, which converts the video data into analog luminance and chrominance signals. The analog luminance and chrominance signals are supplied to the video signal processor 10 and processed thereby into an RGB signal, which is supplied to the cathode-ray tube 11 to display a corresponding image.

Therefore, the transmission of commands from the central processing unit 6 to the memory controller 23 makes it possible to display scaled-down images in various display modes based on how video data are processed when they are stored in the frame memory 24 by the memory controller 23. The display modes that are available in the television receiver 1 will be described below.

Figure 4:
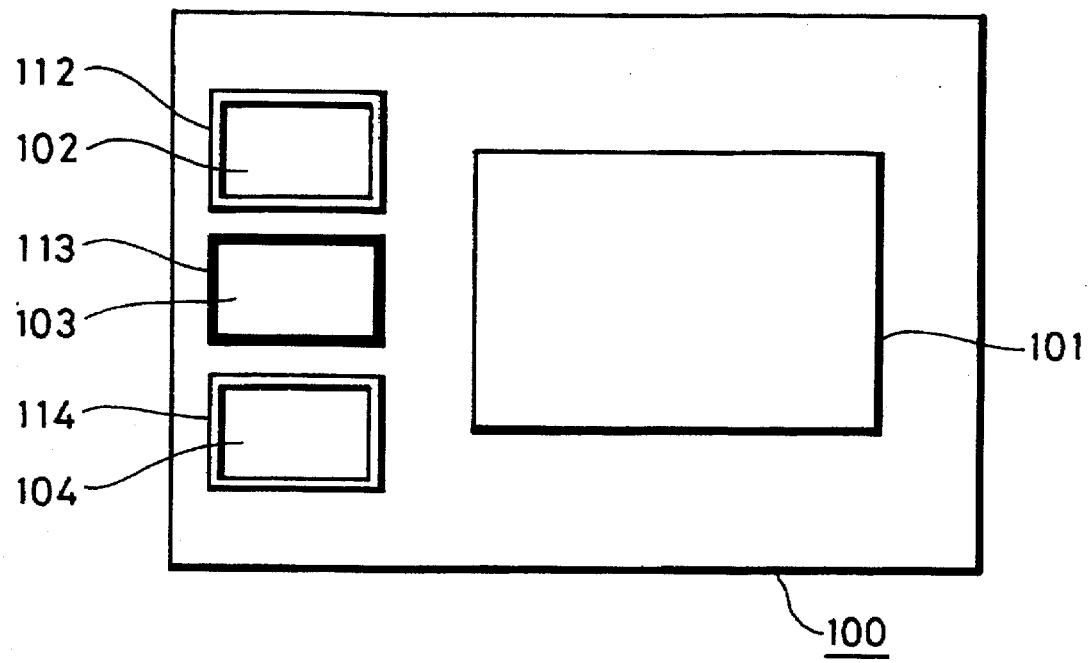
FIG. 4 is a view showing a display mode for displaying auxiliary images on a display raster of the image display apparatus.

FIG. 4 shows a display mode for displaying auxiliary images on a display raster 100 of the cathode-ray tube 11. In the display mode shown in FIG. 4, a larger main image 101 is displayed in a right-hand area of the display raster 100, and three smaller auxiliary images 102, 103, 104 in a vertical row are displayed in a left-hand area of the display raster 100. The three auxiliary images 102, 103, 104 are surrounded by respective frames 112, 113, 114 that are also displayed on the display raster 100. The colors of the displayed frames 112, 113, 114 are changed under the control of the central processing unit 6 depending on the selection of one of these displayed frames 112, 113, 114. For example, when the user selects and indicates, with the remote control unit, one of the displayed auxiliary images 102, 103, 104 as replacing the main image 101, the frame around the indicated auxiliary image is made different in color from the other frames.

The relationship between the input video data and the main and auxiliary images 101, 102, 103, 104 is as follows: The main image 101 is produced from a digital video signal which is generated and supplied to the memory controller 23 when a video signal in a channel received by the tuner 4 is processed by the decoder 21a and the A/D converter 22a. For the display of the main image 101, the channel received by the tuner 4 is fixed, and the digital video signal is stored field by field in the frame memory 24, so that the main image 101 is displayed as a complete moving image. The auxiliary images 102, 103, 104 are produced from digital video signals which are generated and supplied to the memory controller 23 when video signals in respective channels received by the tuner 5 are processed by the decoders 21b and the A/D converters 22b. For the display of the auxiliary images 102, 103, 104, the channels received by the tuner 5 are changed cyclically in certain periods, e.g., of several seconds, to display the auxiliary images 102, 103, 104 in the respective channels on the display raster 100. Therefore, each of the auxiliary images 102, 103, 104 is displayed as a pseudomoving image that varies in several seconds, for example.

Figure 5:
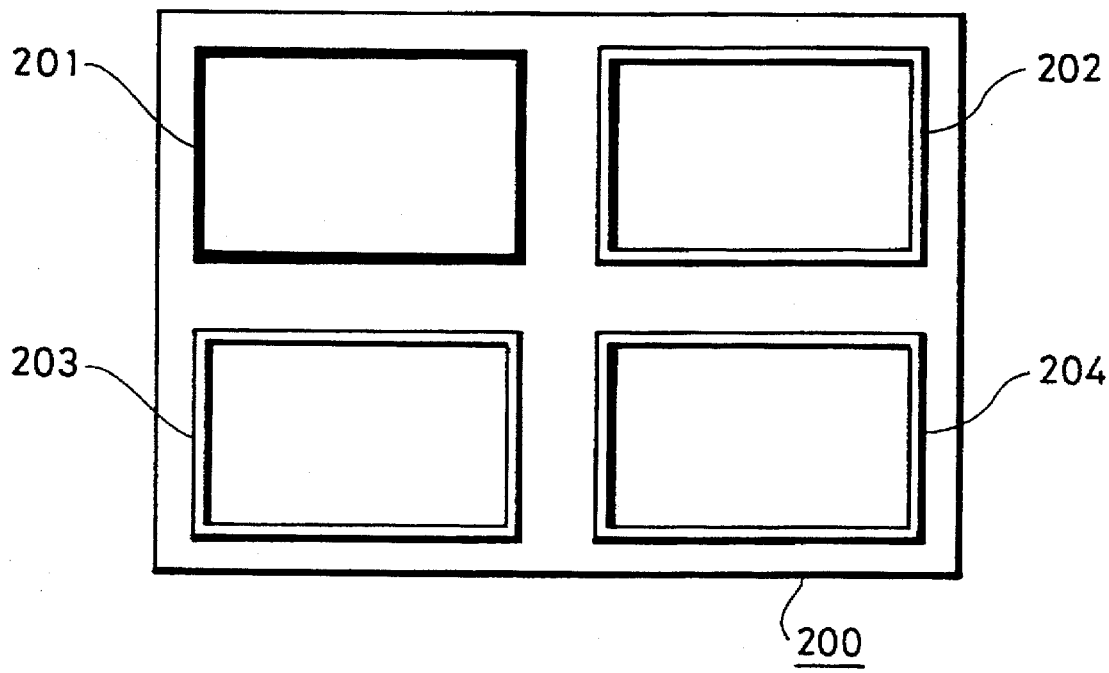
FIG. 5 is a view showing another display mode for displaying auxiliary images on a display raster of the image display apparatus.

FIG. 5 shows another display mode for displaying auxiliary images on a display raster 200 of the cathode-ray tube 11. In the display mode shown in FIG. 5, the display raster 200 is divided into four equal raster areas in a matrix, and a main image 201 and three auxiliary images 202, 203, 204, which are of the same size, are displayed in the respective raster areas. The main and auxiliary images 201, 202, 203, 204 are surrounded by respective frames that are also displayed on the display raster 200. The colors of the displayed frames are changed depending on the selection of one of these displayed frames. The color of the frame around the main image 201 is different from the color of the frames around the auxiliary images 202, 203, 204. The main image 201 is produced as a complete moving image from a digital video signal which is generated and supplied to the memory controller 23 when a video signal in a channel received by the tuner 4 is processed by the decoder 21a and the A/D converter 22a. The auxiliary images 202, 203, 204 are produced from digital video signals which are generated and supplied to the memory controller 23 when video signals in respective channels received by the tuner 5 are processed by the decoders 21b and the A/D converters 22b. For the display of the auxiliary images 202, 203, 204, the channels received by the tuner 24 are changed cyclically in certain periods to display the auxiliary images 202, 203, 204 in the respective channels on the display raster 200. Therefore, each of the auxiliary images 202, 203, 204 is displayed as a pseudomoving image that varies in several seconds, for example.

Figure 6:
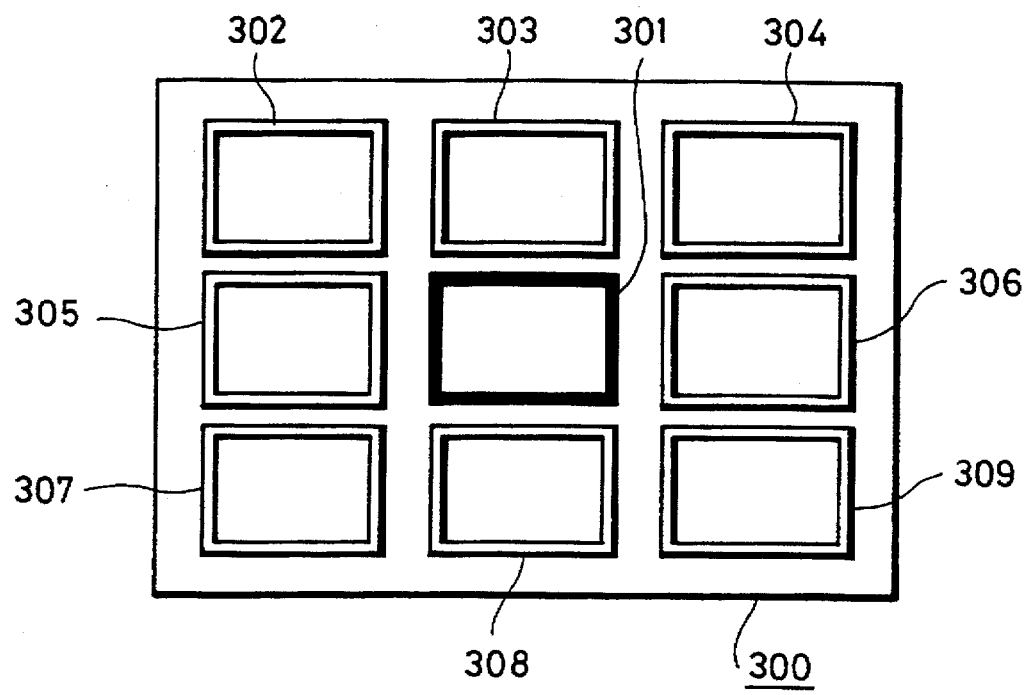
FIG. 6 is a view showing still another display mode for displaying auxiliary images on a display raster of the image display apparatus.

FIG. 6 shows still another display mode for displaying auxiliary images on a display raster 300 of the cathode-ray tube 11. In the display mode shown in FIG. 6, the display raster 300 is divided into nine equal raster areas, and a main image 301 and eight auxiliary images 302, 303, 304, ..., 309 which are of the same size, are displayed in the respective raster areas. The main image 301 is positioned in the central raster area that is surrounded by the auxiliary images 302–309. The main and auxiliary images 301–309 are surrounded by respective frames that are also displayed on the display raster 300. The colors of the displayed frames are changed depending on the selection of one of these displayed frames. The color of the frame around the main image 301 is different from the color of the frames around the auxiliary images 302–309. The main image 301 is produced as a complete moving image from a digital video signal which is generated and supplied to the memory controller 23 when a video signal in a channel received by the tuner 4 is processed by the decoder 21a and the A/D converter 22a. The auxiliary images 302–309 are produced from digital video signals which are generated and supplied to the memory controller 23 when video signals in respective channels received by the tuner 5 are processed by the decoders 21b and the A/D converters 22b. For the display of the auxiliary images 302–309, the channels received by the tuner 24 are changed cyclically in certain periods to display the auxiliary images 302–309 in the respective channels on the display raster 300. Therefore, each of the auxiliary images 302–309 is displayed as a pseudomoving image that varies in several seconds, for example.

Figure 7:
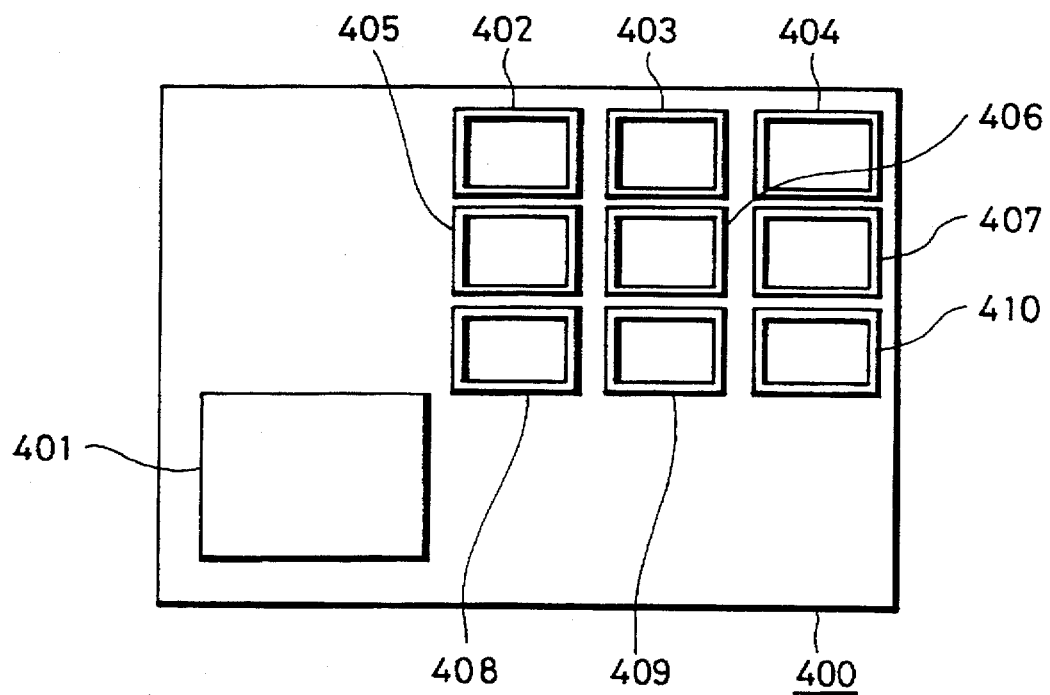
FIG. 7 is a view showing yet still another display mode for displaying auxiliary images on a display raster of the image display apparatus.

FIG. 7 shows yet still another display mode for displaying auxiliary images on a display raster 400 of the cathode-ray tube 11. In the display mode shown in FIG. 7, a larger main image 401 is displayed in a lower left-hand area of the display raster 400, and nine auxiliary images 402, 403, ..., 410 in a matrix are displayed in an upper right-hand area of the display raster 400. The auxiliary images 402–410 are surrounded by respective frames that are also displayed on the display raster 400. The colors of the displayed frames are changed under the control of the central processing unit 6 depending on the selection of one of these displayed frames 402–410. The main image 401 is produced as a complete moving image from a digital video signal which is generated and supplied to the memory controller 23 when a video signal in a channel received by the tuner 4 is processed by the decoder 21a and the A/D converter 22a. The auxiliary images 402–410 are produced from digital video signals which are generated and supplied to the memory controller 23 when video signals in respective channels received by the tuner 5 are processed by the decoders 21b and the A/D converters 22b. For the display of the auxiliary images 402–410, the channels received by the tuner 24 are changed cyclically in certain periods to display the auxiliary images 402–410 in the respective channels on the display raster 400. Therefore, each of the auxiliary images 402–410 is displayed as a pseudomoving image that varies in several seconds, for example.

Figure 8:
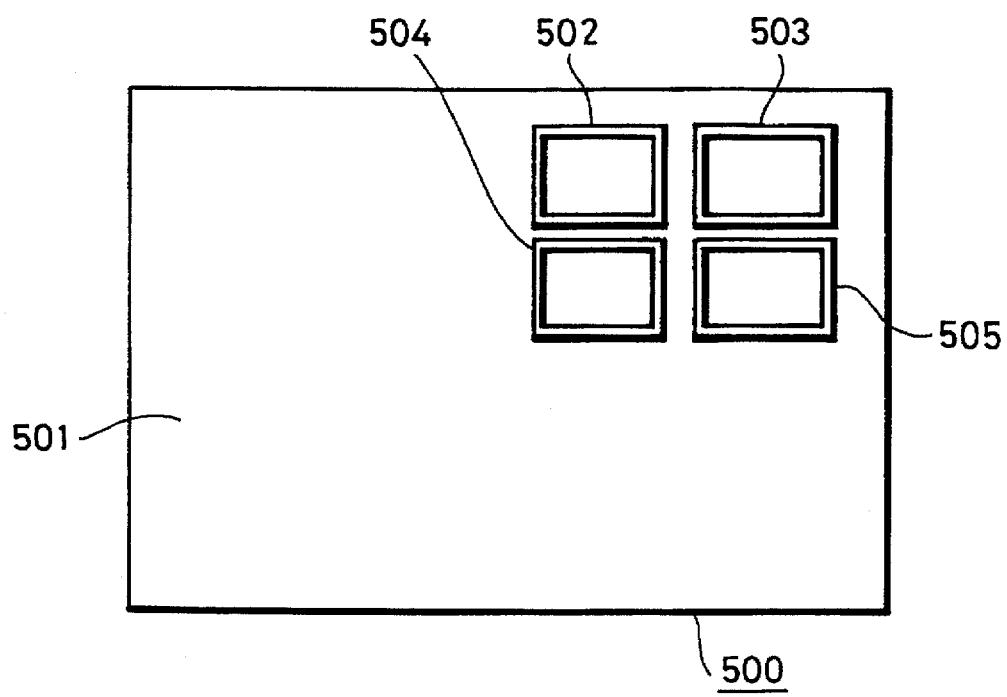
FIG. 8 is a view showing a further display mode for displaying auxiliary images on a display raster of the image display apparatus.

FIG. 8 shows a further display mode for displaying auxiliary images on a display raster 500 of the cathode-ray tube 11. In the display mode shown in FIG. 8, a main image 501 is displayed entirely on the display raster 500, and four auxiliary images 502, 503, 504, 505 in a matrix are displayed in an upper right-hand area of the display raster 500 in overlapping relation to the main image 501. The auxiliary images 502–505 are surrounded by respective frames that are also displayed on the display raster 500. The colors of the displayed frames are changed under the control of the central processing unit 6 depending on the selection of one of these displayed frames. The main image 501 is produced as a complete moving image from a digital video signal which is generated and supplied to the memory controller 23 when a video signal in a channel received by the tuner 4 is processed by the decoder 21a and the A/D converter 22a. The auxiliary images 502–505 are produced from digital video signals which are generated and supplied to the memory controller 23 when video signals in respective channels received by the tuner 5 are processed by the decoders 21b and the A/D converters 22b. For the display of the auxiliary images 502–505, the channels received by the tuner 24 are changed cyclically in certain periods to display the auxiliary images 502–505 in the respective channels on the display raster 500. Therefore, each of the auxiliary images 502–505 is displayed as a pseudomoving image that varies in several seconds, for example.

Figure 9:
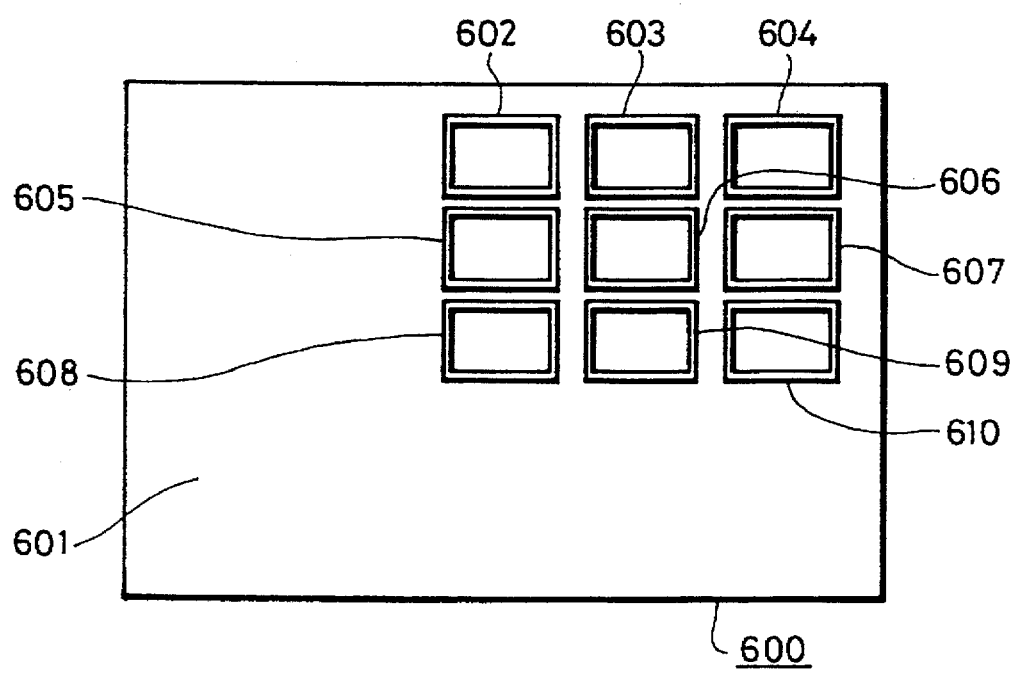
FIG. 9 is a view showing a still further display mode for displaying auxiliary images on a display raster of the image display apparatus.

FIG. 9 shows a still further display mode for displaying auxiliary images on a display raster 600 of the cathode-ray tube 11. In the display mode shown in FIG. 9, a main image 601 is displayed entirely on the display raster 600, and nine auxiliary images 602, 603, ..., 610 in a matrix are displayed in an upper right-hand area of the display raster 600 in overlapping relation to the main image 601. The auxiliary images 602–610 are surrounded by respective frames that are also displayed on the display raster 600. The colors of the displayed frames are changed under the control of the central processing unit 6 depending on the selection of one of these displayed frames. The main image 601 is produced as a complete moving image from a digital video signal which is generated and supplied to the memory controller 23 when a video signal in a channel received by the tuner 4 is processed by the decoder 21a and the A/D converter 22a. The auxiliary images 602–610 are produced from digital video signals which are generated and supplied to the memory controller 23 when video signals in respective channels received by the tuner 5 are processed by the decoders 21b and the A/D converters 22b. For the display of the auxiliary images 602–610, the channels received by the tuner 24 are changed cyclically in certain periods to display the auxiliary images 602–610 in the respective channels on the display raster 600. Therefore, each of the auxiliary images 602–610 is displayed as a pseudomoving image that varies in several seconds, for example.

In each of the display modes shown in FIGS. 4 through 9, each of the main and auxiliary images displayed on the display raster has an aspect ratio of 4:3. However, the image display apparatus according to the present invention can simultaneously display at least one image having an aspect ratio of 4:3 according to an ordinary broadcasting system and at least one image having an aspect ratio of 16:9 according to another broadcasting system such as a high-definition television broadcasting system.

Figure 10:
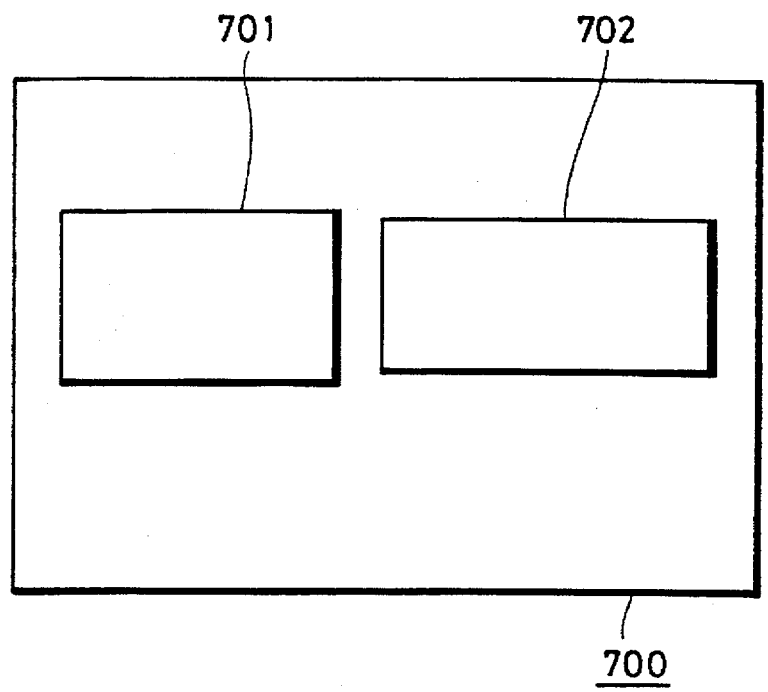
FIG. 10 is a view showing a yet still further display mode for displaying images having different aspect ratios on a display raster of the image display apparatus.

FIG. 10 shows a yet still further display mode for displaying images having different aspect ratios on a display raster 700 of the cathode-ray tube 11. In the display mode shown in FIG. 10, a main image 701 having an aspect ratio of 4:3 is displayed in a left-hand area of the display raster 700, and an auxiliary image 702 having an aspect ratio of 16:9 is displayed in a right-hand area of the display raster 700. The main image 701 is produced as a complete moving image from a digital video signal which is generated and supplied to the memory controller 23 when a video signal in a channel received by the tuner 4 is processed by the decoder 21a and the A/D converter 22a. The auxiliary image 702 is produced as a complete moving image from a digital video signal which is generated and supplied to the memory controller 23 when a video signal in a channel received by the tuner 5 is processed by the decoders 21b and the A/D converters 22b. The channel received by the tuner 5 belongs to a broadcasting system such as a high-definition television broadcasting system which broadcasts images at an aspect ratio of 16:9. Therefore, the tuner 5 is designed to receive problems in such a broadcasting system. The channel received by the tuner 4 belongs to an ordinary broadcasting system which broadcasts images at an aspect ratio of 4:3.

Figure 11:
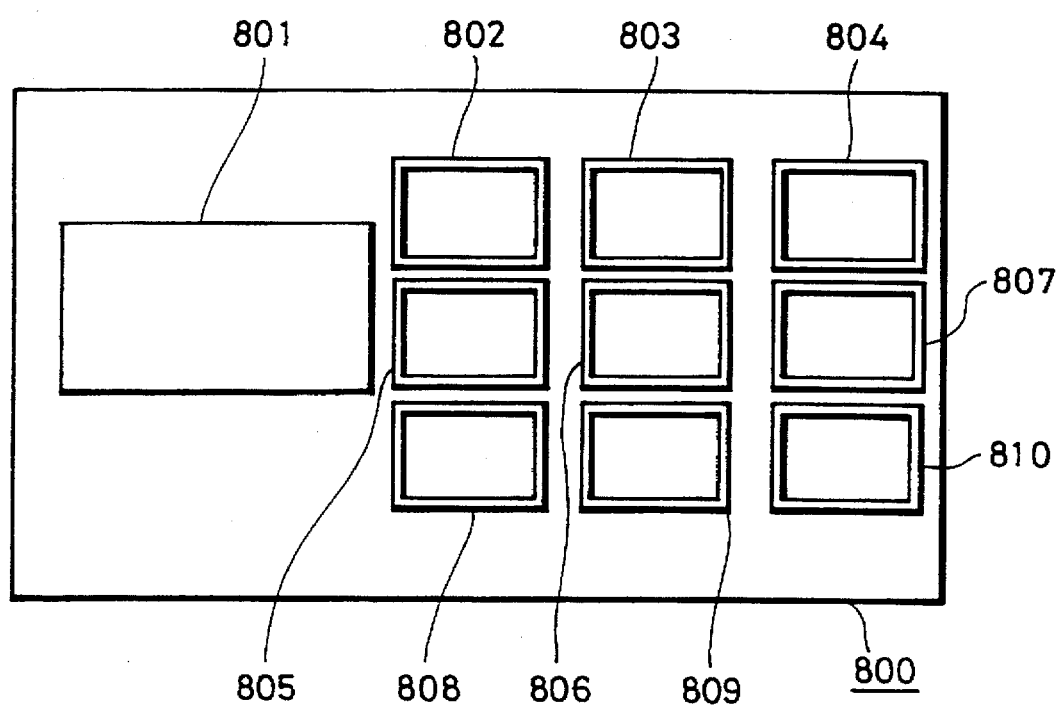
FIG. 11 is a view showing another display mode for displaying images having different aspect ratios on a display raster of the image display apparatus.

FIG. 11 shows another display mode for displaying auxiliary images on a display raster 800 of the cathode-ray tube 11, the display raster 800 having an aspect ratio of 16:9. In the display mode shown in FIG. 11, a larger main image 801 having an aspect ratio of 16:9 is displayed in a left-hand area of the display raster 800, and nine auxiliary images 802, 803, . . . , 810 in a matrix are displayed in a right-hand area of the display raster 800. The main image 801 is displayed as a complete moving image in a fixed channel received by the tuner 4. The auxiliary images 802~810 are displayed as pseudomoving images in channels received by the tuner 5 which are changed cyclically in certain periods. The auxiliary images 802~810 are surrounded by respective colored frames that are also displayed on the display raster 800.

Figure 12:
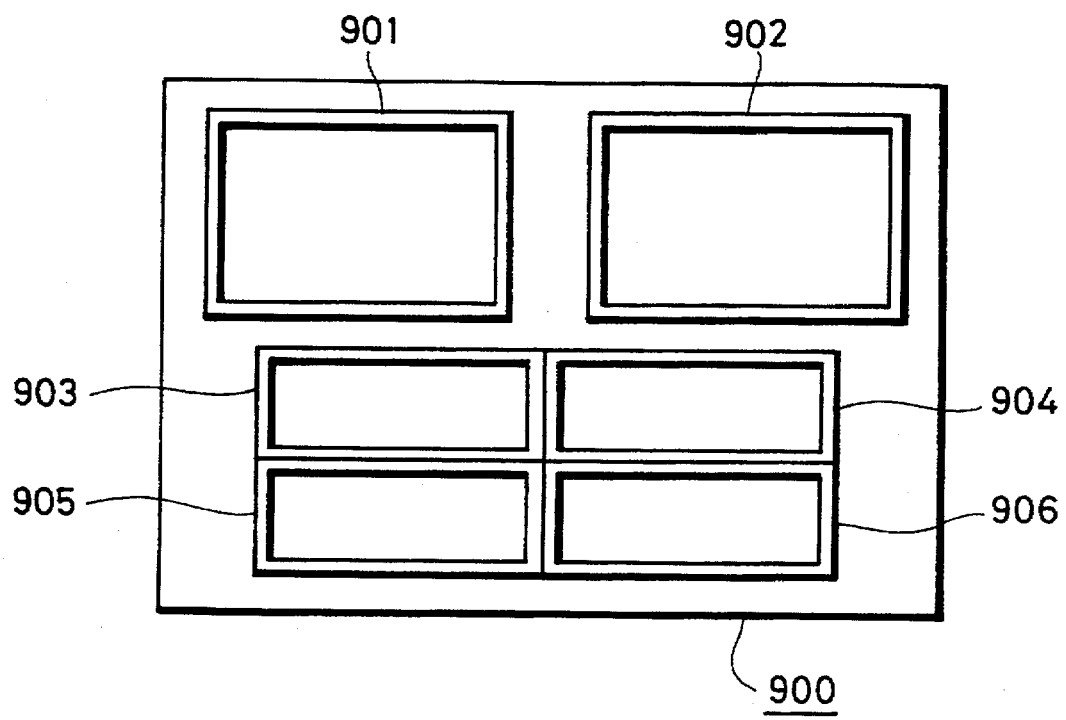
FIG. 12 is a view showing still another display mode for displaying images having different aspect ratios on a display raster of the image display apparatus.

In the above embodiments, video data are supplied to the memory controller 23 through two circuits composed of the two decoders 21a, 21b and the two A/D converters 22a, 22b. If video data are supplied to the memory controller 23 through three circuits, then the image display apparatus can simultaneously display three moving images or two moving images and a plurality of pseudomoving images. FIG. 12 shows still another display mode for displaying images having different aspect ratios on a display raster 900 of the cathode-ray tube 11 through such three circuits. In the display mode shown in FIG. 12, a larger main image 901 having an aspect ratio of 4:3 is displayed in an upper left-hand area of the display raster 900, a larger auxiliary image 902 having an aspect ratio of 4:3 is displayed in an upper right-hand area of the display raster 900, and four smaller auxiliary images 903, 904, 905, 906 having an aspect ratio of 16:9 are displayed in a lower area of the display area 900. The main image 901 is displayed as a complete moving image in a fixed channel received by the tuner 4. The auxiliary image 902 is displayed as a complete moving image based on a video signal supplied to either one of the input terminals 9a~9c. The auxiliary images 902~906 are displayed as pseudomoving images in channels received by the tuner 5 which are changed cyclically in certain periods. The auxiliary images 902~906 are surrounded by respective colored frames that are also displayed on the display raster 900.

Except for the display mode shown in FIG. 12, the main and auxiliary images are displayed based on video signals received by the tuners 4, 5. However, the main and auxiliary images may be displayed based on video signals supplied to the input terminals 9a~9c.

An audio playback system (not shown) of the image display apparatus according to the present invention is usually arranged to reproduce an audio signal that is associated with the main image which is being displayed on the raster. However, the audio playback system may reproduce another audio signal that is not associated with the displayed main image.

In the above embodiments, the frames displayed around the displayed images are distinguishable by color changes. However, the displayed frames may be made distinguishable by brightness changes.

Where only a plurality of auxiliary images are displayed in juxtaposed relation to each other, it is possible to increase the resolution of the displayed auxiliary images. An arrangement for increasing resolution of displayed auxiliary images will be described below.

Figure 1:
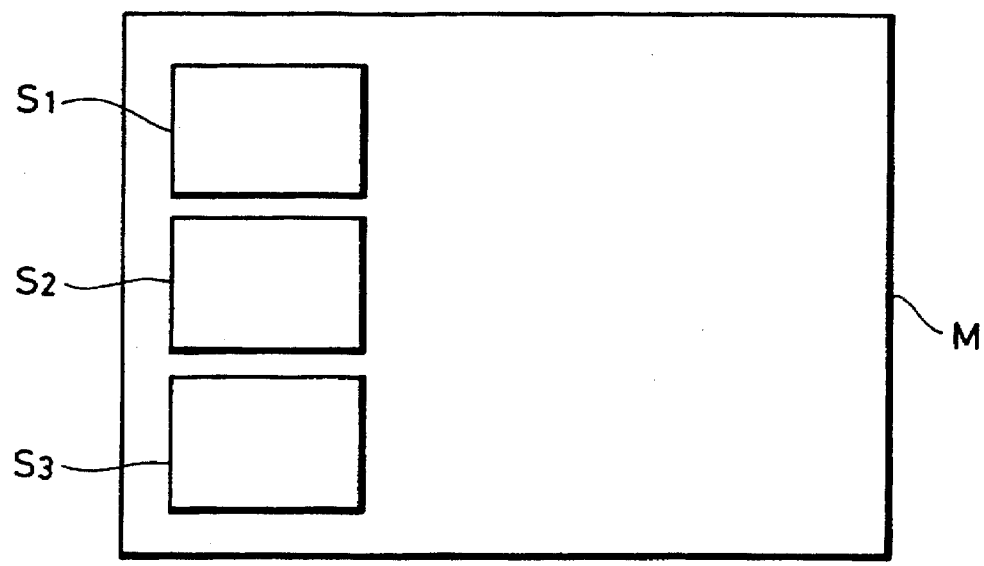
FIG. 1 is a view showing a conventional example of auxiliary images displayed on a display raster.
Figure 2:
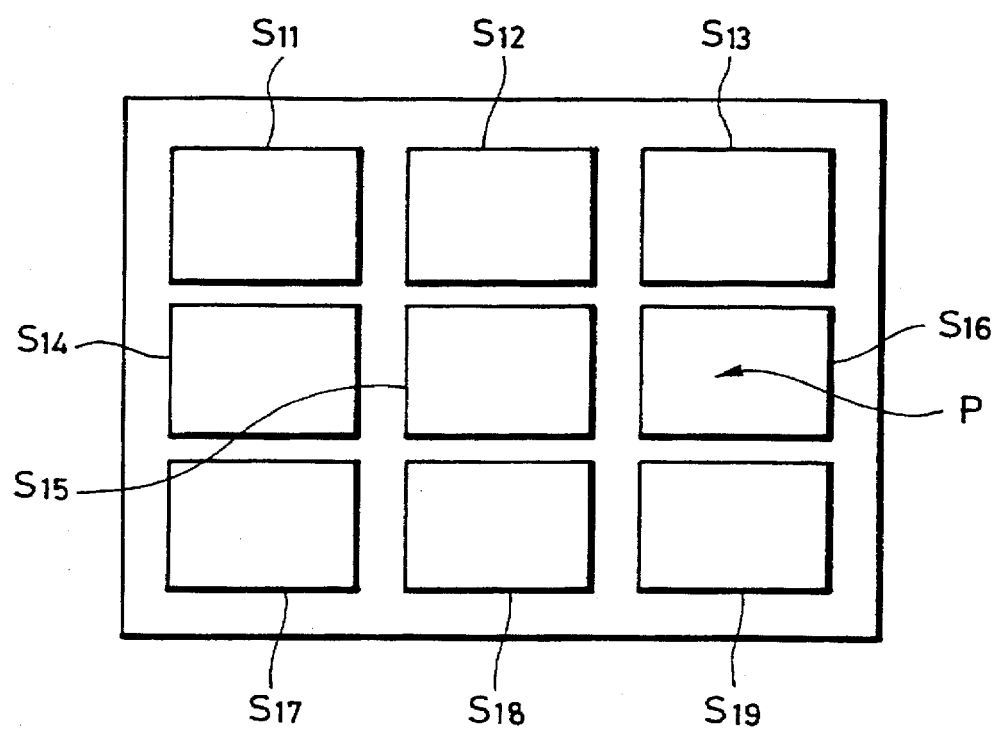
FIG. 2 is a view showing another conventional example of auxiliary images displayed on a display raster.

It is assumed that two scaled-down images are to be simultaneously displayed in juxtaposed relation to each other on the cathode-ray tube 11. In FIG. 1, the switch circuit 8 selects two of video signals that are supplied from the tuners 4, 5 and the video signal input terminals 9a, 9b, 9c and supplies the selected two video signals to the respective decoders 21a, 21b under the control of the central processing unit 6. The decoders 21a, 21b demodulate the supplied video signals into luminance and chrominance signals, and supply the luminance and chrominance signals to the A/D converters 22a, 22b. The A/D converters 22a, 22b convert the supplied luminance and chrominance signals into digital video signals, which are supplied to the memory controller 23. The memory controller 23 is also supplied with synchronizing signals that are extracted from the video signals supplied to the decoders 21a, 21b.

The frame memory 24 connected to the memory controller 23 stores the two digital video signals supplied from the A/D converters 22a, 22b under the control of the memory controller 23 based on a command from the central processing unit 6. Each of the digital video signals stored in the frame memory 24 is composed of video data that are generated by cropping or decimating every other dot of video data of each horizontal scanning line so that the number of dots of the stored video data is ½ of the number of dots of the original video data. At this time, no horizontal scanning lines are cropped or decimated, but cropped or decimated video data of all the horizontal scanning lines are stored in the frame memory 24. The two digital video signals are stored in the frame memory 24 as follows: The video data of the digital video signal supplied from the A/D converter 22a are stored in an image storage subarea which is a left-hand half of an image storage area for storing one field of image in the frame memory 24, and the video data of the digital video signal supplied from the A/D converter 22b are stored in an image storage subarea which is a right-hand half of the image storage area. The video data are stored in the frame memory 24 successively field by field.

The video data of the two digital video signals stored in the frame memory 24 are read successively field by field, and supplied to the D/A converter 25, which converts the supplied video data into analog luminance and chrominance signals. The analog luminance and chrominance signals are then supplied to the video signal processor 10, which processes the supplied video signals into RGB signals and supplies the RGB signals to the cathode-ray tube 11 to display corresponding images thereon.

At this time, the central processing unit 6 supplies a control signal to the vertical deflecting circuit 13 to cause the vertical deflecting coil 14V to deflect the electron beam in the cathode-ray tube 11 through a vertical deflection angle that is ½ of the normal vertical deflection angle. The horizontal deflecting circuit 12 controls the horizontal deflecting coil 14H to deflect the electron beam through a normal horizontal deflection angle.

Figure 13:
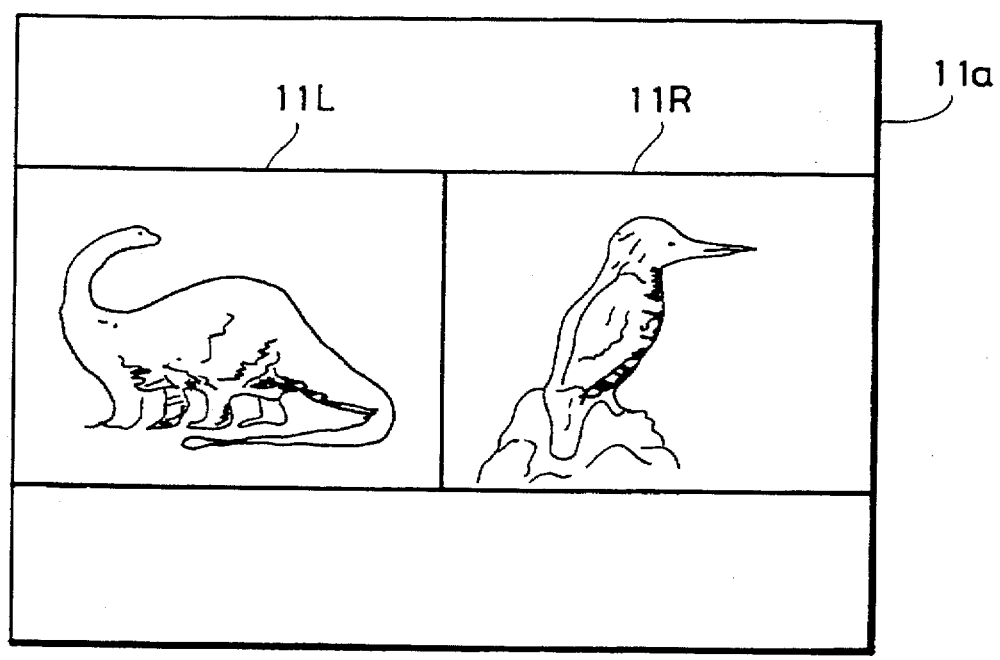
FIG. 13 is a view showing a further display mode for displaying scaled-down images with high resolution on a display raster of the image display apparatus.

The above arrangement displays scaled-down images in a display mode shown in FIG. 13. In the display mode shown in FIG. 13, an image based on one video signal selected by the switch circuit 8 is displayed in a central left-hand area 11L of a display raster 11a on the cathode-ray tube 11 at a size which is ½ of the normal size (an area which is ¼ of the normal area), and an image based on the other video signal selected by the switch circuit 8 is displayed in a central right-hand area 11R of the display raster 11a at a size which is ½ of the normal size.

Figure 14A:
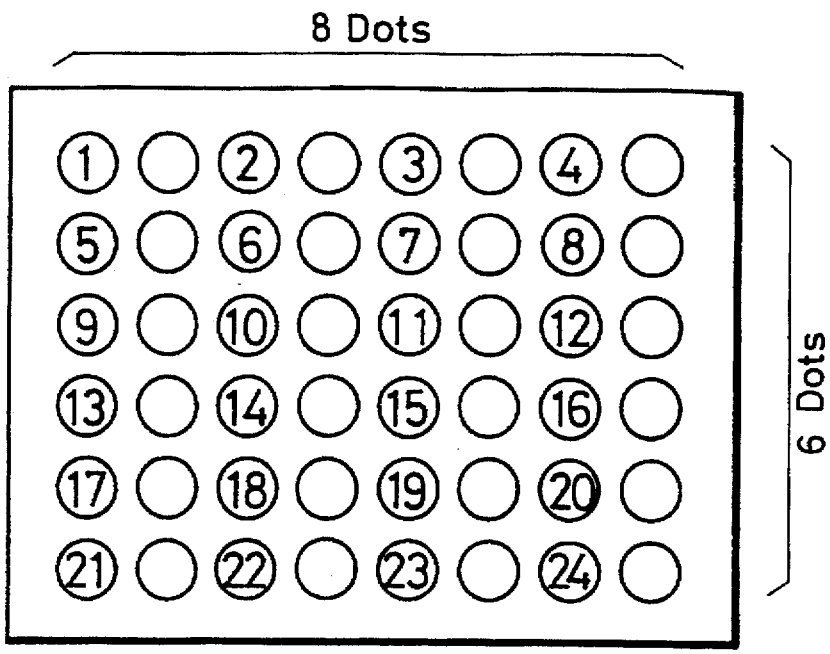
FIGS. 14A through 14C are diagrams illustrative of video data structures of scaled-down images.

In the display mode shown in FIG. 13, the vertical resolution of the scaled-down images that are displayed remains substantially the same as the vertical resolution of images which are not scaled down, i.e., which are displayed fully over the display raster 11a. The principles of this display mode will be described below with reference to FIGS. 14A through 14C. It is assumed that one field of digital video data produced by the A/D converters 22a, 22b is composed of 48 dots (horizontal 8 dots×vertical 6 dots), as shown in FIG. 14A. The number of dots used in FIG. 14A is minimized for illustrative purpose. At this time, the video data that are stored in the frame memory 24 are composed of 24 dots (numbered dots in FIG. 14A) that are obtained when every other dot of each horizontal scanning line is cropped or decimated.

Figure 14B:
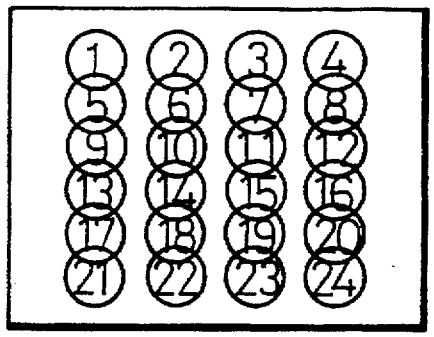

Using the 24-dot video data stored in the frame memory 24, the scaled-down images are displayed as shown in FIG. 13. Since the vertical deflection angle through which the electron beam is vertically deflected in the cathode-ray tube 11 by the vertical deflecting coil 14V is ½ of the normal vertical deflection angle, the vertical distance between adjacent horizontal lines is reduced to ½, and hence all the horizontal scanning lines are displayed in a vertical interval which is ½ of the normal vertical interval as shown in FIG. 14B. Therefore, the vertical resolution of the scaled-down images remains the same as the vertical resolution of images which are displayed fully over the display raster 11a.

Figure 14C:
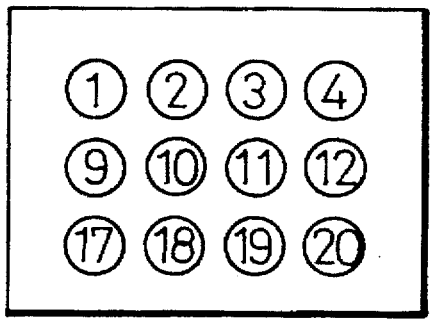

FIG. 14C shows a data structure of video data for displaying an image at a scale-down ratio of ½ on a conventional image display apparatus. Since the vertical deflection angle is not varied in the conventional image display apparatus, the number of horizontal scanning lines that are displayed is reduced to ½, and every other horizontal scanning line is cropped or decimated, with the result that the vertical resolution is also reduced to ½.

Images in two different channels may be displayed in juxtaposed relation to each other as shown in FIG. 13 when the two different channels are selected by the respective tuners 4, 5 and video signals outputted by the tuners 4, 5 are selected by the switch circuit 8 and supplied to the frame memory 24. One or both of the images displayed as shown in FIG. 13 may be produced from video signals supplied to the input terminals 9a–9c.

While two images that are scaled down to ½ are displayed in juxtaposed relation to each other in the display mode shown in FIG. 13, three or more images may simultaneously be displayed according to the present invention. If the scale-down ratio is set to other than ½, then it is necessary to vary the vertical deflection angle accordingly.

According to the present invention, since the manner in which the frames are displayed respectively around the auxiliary images can be changed individually, any selected one of the auxiliary images can well be indicated by the associated frame, allowing the user to confirm the selected auxiliary image with ease, without any dropouts of displayed information which would otherwise result from use of a pointer displayed on a selected one of the auxiliary images.

At least one auxiliary image may be of an aspect ratio of a broadcasting system that is different from the broadcasting system of a main image or other auxiliary images. images having aspect ratios of different broadcasting systems can simultaneously be displayed in juxtaposed relation to each other. Consequently, the image display apparatus is free of limitations which would otherwise be imposed on the types of auxiliary images that can be displayed. The image display apparatus is thus convenient to use as a television receiver.

Furthermore, the vertical deflection angle for a scaled-down image displayed on the cathode-ray tube is reduced in proportion to the scale-down ratio of the scaled-down image. Therefore, the number of horizontal scanning lines of the displayed scaled-down image remains unchanged, and the vertical resolution thereof is not lowered, permitting the user to confirm well characters which may exist in the displayed scaled-down image. A plurality of different input video signals may be stored in the frame memory and may simultaneously be displayed as scaled-down images, so that the scaled-down images can be displayed at a high resolution.

When a video signal is stored into the frame memory field by field, a scaled-down image can be displayed as a moving image similar to ordinary moving images that change on a real-time basis.

In addition, a video signal representing a combination of main and auxiliary images to be displayed can be outputted from the output terminal and recorded on a VTR or the like. Thus, images displayed in various display modes, which may represent a combination of main and auxiliary images, for example, can be recorded on a VTR or the like.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An image display apparatus comprising:

a memory for storing digital video signals formed of a plurality of dots for each horizontal scan line; and a memory controller for controlling writing of said digital video signals into said memory such that only every other one of said plurality of dots for each horizontal scan line is stored in said memory;

control means for retrieving said stored video signals from said memory and displaying a combination of main and auxiliary images on a display raster based on said stored video signals without cropping data of the video signal in a vertical direction of the display raster;

said control means comprising means for displaying a plurality of auxiliary images surrounded by respective frames, and means responsive to a control signal for individually changing the manner in which the frames are displayed respectively around the auxiliary images.

2. An image display apparatus comprising:

a memory for storing digital video signals formed of a plurality of dots for each horizontal scan line; and a memory controller for controlling writing of said digital video signal into said memory such that only every other one of said plurality of dots for each horizontal scan line is stored in said memory;

control means for retrieving said stored video signals from said memory and displaying a combination of main and auxiliary images on a display raster based on said stored video signals without cropping data of the video signal in a vertical direction of the display raster;

said control means comprising means for displaying a plurality of auxiliary images and means for displaying at least one of the auxiliary images as an image having as aspect ratio which is different from the aspect ratio of the main image or another auxiliary image.

3. An image display apparatus according to claim 1 or 2, further comprising a single tuner for successively cyclically receiving video signals transmitted in a plurality of channels as representing the respective auxiliary images, whereby each of the plurality of auxiliary images is periodically updated to produce a moving image.

4. An image display apparatus according to claim 1 or 2, wherein said control means further comprises means for displaying the main and auxiliary images without overlapping each other.

5. An image display apparatus comprising:

a memory for storing a digital video signal formed of a plurality of dots for each horizontal scan line; and control means for displaying an image which is scaled down to 1/n (1<n) in vertical height on a display raster on a cathode-ray tube based on the video signal stored in said memory;

said control means comprising a memory controller for cropping data of each horizontal scanning line of the video signal to be stored in said memory to 1/n by storing 1/n th of said plurality of dots for each horizontal scan line without cropping data of the video signal in a vertical direction, and means for reducing a vertical deflection angle to 1/n in the cathode-ray tube when the video signal read from said memory is supplied to the cathode-ray tube.

6. An image display apparatus according to claim 5, further comprising input means connected to said memory for receiving a plurality of different video signals for storage in said memory.

7. An image display apparatus according to claim 5, further comprising means for storing the video signal field by field into said memory.

* * * * *